(12) United States Patent
Nodfelt et al.

(10) Patent No.: US 6,816,644 B1
(45) Date of Patent: Nov. 9, 2004

(54) LENS SYSTEM WITH VARIABLE FOCAL LENGTH FOR CONNECTING OPTICAL FIBRES

(76) Inventors: Ingvar Nils Nodfelt, Målaregården 8, S-246 33 Löddeköpinge (SE); Hans S. Hallstadius, Vadenkroken 28, S-226 47 Lund (SE)

( * ) Notice: Subject to any disclaimer, the term of this patent is extended or adjusted under 35 U.S.C. 154(b) by 0 days.

(21) Appl. No.: 10/351,796

(22) Filed: Jan. 27, 2003

Related U.S. Application Data

(63) Continuation of application No. PCT/SE01/01661, filed on Jul. 23, 2001.

(30) Foreign Application Priority Data

Jul. 27, 2000 (SE) .............................................. 0002795

(51) Int. Cl.⁷ .............................. G02B 6/32; G02B 6/38
(52) U.S. Cl. .............................. 385/33; 385/58; 385/61
(58) Field of Search .............................. 385/33, 55, 56, 385/58, 60–62, 70, 72–74, 76–79

(56) References Cited

U.S. PATENT DOCUMENTS

| | | | |
|---|---|---|---|
| 4,451,115 A | 5/1984 | Nicia et al. ................... 385/74 |
| 4,753,510 A * | 6/1988 | Sezerman ..................... 385/61 |
| 5,533,159 A * | 7/1996 | Okochi et al. ................ 385/93 |
| 6,535,668 B2 * | 3/2003 | Liu et al. ...................... 385/33 |
| 6,546,169 B1 * | 4/2003 | Lin et al. ...................... 385/39 |
| 2002/0131699 A1 * | 9/2002 | Raguin et al. ................ 385/33 |
| 2002/0197020 A1 * | 12/2002 | Qian et al. .................... 385/80 |

FOREIGN PATENT DOCUMENTS

| | | | | |
|---|---|---|---|---|
| GB | 2002136 | | 7/1978 | ............ G02B/5/14 |
| JP | 59009615 | | 1/1984 | ............ G02B/7/26 |
| JP | 02235007 A | * | 9/1990 | ............ G02B/6/32 |

\* cited by examiner

*Primary Examiner*—John D. Lee
(74) *Attorney, Agent, or Firm*—Gauthier & Connors LLP

(57) ABSTRACT

A coupling device for axially coupling together the ends of very thin optical fibres, fixed in one coupling house each, for achieving an optical connection between the fibres, and comprising a lens system arranged in each coupling house consisting a lens body, a glass body, a space for an optically means, and a fibre contact coaxially arranged thereto, shaped as a holder for at least one fibre. The focal point of the lens body is arranged to coincidence with the end surface of the fibre contact facing the lens body. The glass body is arranged to constitute a rear limit for the lens system, and is axially adjustable so that the focal point of the lens system, for the wavelength used, coincidences with the rear end surface of the lens system and the glass body, and thereby the end surface of the fibre contact facing the lens system.

11 Claims, 3 Drawing Sheets

LENS SYSTEM WITH VARIABLE FOCAL LENGTH FOR CONNECTING OPTICAL FIBRES

This is a continuation of copending application International Application PCT/SE01/01661 filed on Jul. 23, 2001 and which designated the U.S.

TECHNICAL FIELD OF THE INVENTION

The invention relates to a lens system for monochromatic, or almost monochromatic light, in which the focal distance can be adjusted for parallel, or substantially parallel, incident light to be refracted together to one focal point, which coincidences with, for example, the end surface of an optical fibre. Then the lens system can be applied in for example coupling arrangements, for axially connecting the end sections of at least one optical fibre to each other, which are fixed in at least one plug each being arranged in one coupling house, for achieving an optical connection between the fibres, or wherein parallel or substantially parallel, light of one or several adjacent monochromatic light sources to be coupled into one optical fibre with maintained good performance.

BACKGROUND OF THE INVENTION

The fast development of the communication area has increased the demand for faster and more reliable transmission medias drastically. The optical fibres have revolutionized the transmission possibilities. These fibres allow a large number of signals to be transferred in one and the same fibre with the speed of light. As a consequence of the fibre length being limited when manufactured, these must be coupled together by means of different coupling arrangements.

The coupling arrangements must couple together fibres with each other so that the fibre ends are located exactly in front of each other. A problem at the connection of the optical fibres is the insignificant diameter of the fibres, being some or some tenth of a millimetre, while the core of the fibres may have a diameter of 10to 50 $\mu$m. Thus, a radial deviation of some thousandth of a millimetre in the connection causes a large deviation, whereby the transmission losses drastically increase. Hence, very large requirements are put on the tolerances of the coupling device, causing complicated constructions and high manufacturing costs.

In a large number of patent applications, a number of coupling arrangements for optical fibres are known. These arrangements demand specially shaped means for centring the optical fibres relative to each other.

An example of the previously known coupling arrangement is the U.K. patent GB 2002136, in which a spherical lens is used for transmission of light signals, and U.S. 4,451,115 in which the lens devices are radially adjusted in one coupling device each, for compensating for defects built-in with the purpose to optimise the transmission of the light between two fibre ends. In none of the known cases a lens device is described, which can be used for coupling in parallel, or substantially parallel, light into an optical fibre, neither for transmission of light sign~between two optical fibres with maintained optimum transmission of the light signal in more than one wavelengths.

SUMMARY OF THE INVENTION

The object of the present invention is to provide a coupling device for very thin fibres, enabling a very safe and accurate centring and coupling of the fibre ends, enabling to couple fibres of different sizes together, which counteracts deformation of the optical fibres at the connection, which is adjustable for the transmission wavelength being used, minimizing the reflexes in the optical end surfaces of the optical fibres, and admitting more than one fibre channel to be transferred through one and the same lens system. Furthermore, manufacturing of the coupling device will be simple and cheap.

The objects have been solved by each lens system being constituted partly of a lens body, the front end surface of which is convex, for instance spherical, partially spherical or aspherical, and the rear opposite end surface of which is arranged perpendicular to the longitudinal axis of the lens body, partly of a space with a plastic, optical medium, for instance air, an oil or a refractive index adapted gel, partly of a rear glass body, the function of which is to achieve a rear limitation for the optical means, partly to guarantee a good optical contact with the optical fibre, which is mounted in physical contact with the glass body. The front end surface of the glass body, facing the plastic medium, may be convex or plane, while the rear end surface is preferably plane.

The lens body is characterised in that its rear focal point, for the wavelength used in the fibre optical application, is placed outside its rear end surface.

The lens system is characterised in that it contains three optical elements, the middle of which is plastic, that the rear glass body can be displaced in the axial direction by means of the pressure being achieved by the end surface of the optical fibre contact at the mounting of the contact in the coupling arrangement, and consequently that the rear focal point for the lens system always can be brought to coincidence with the rear end surface of the rear glass body.

The end surface of the fibre contact can be plane surface grinded or spherically grinded. In both cases, a very good optical contact between the end surface of the optical fibre and the rear end surface of the glass body is obtained, due to the elastic connection of the rear glass body.

BRIEF DESCRIPTION OF THE DRAWING

FIG. 6 shows a coupling arrangement, in which the lens system is built-in.

DETAILED DESCRIPTION OF THE EMBODIMENTS

Figure 1:
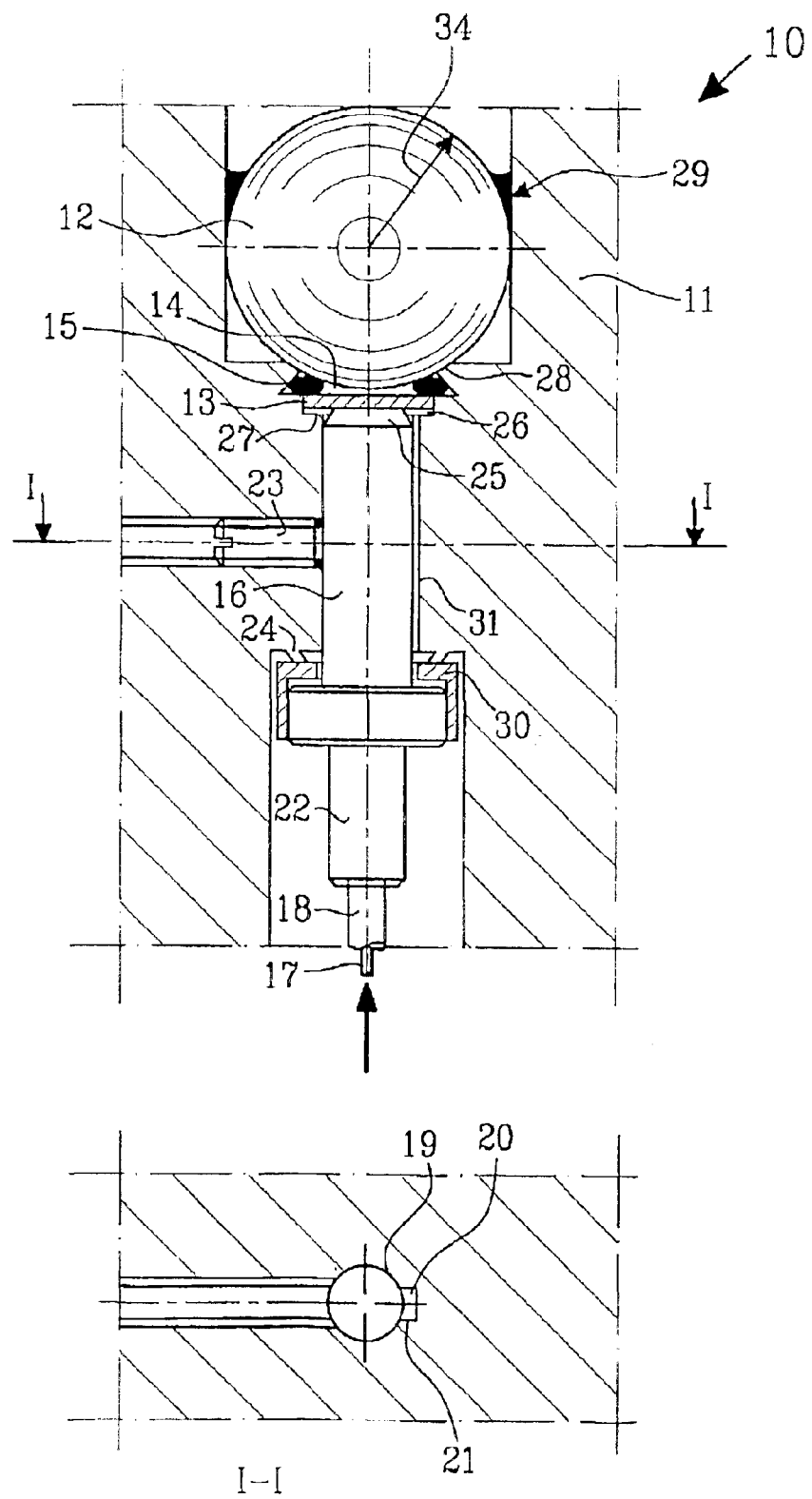
FIG. 1 shows a cross-section of the lens system and its function according to the invention.
Figure 2:
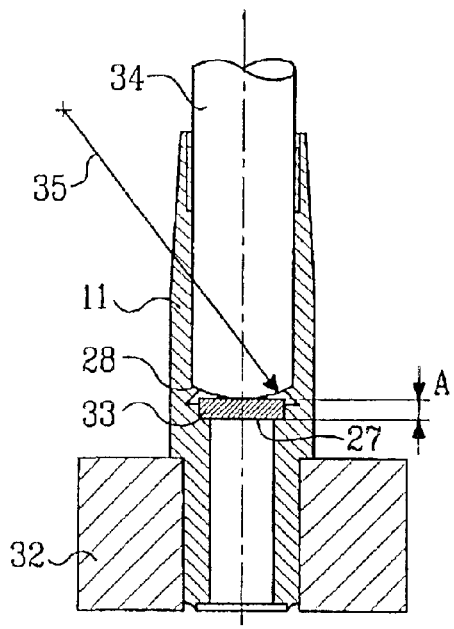
FIG. 2 shows a cross-section, in which the distance A, from the lens body to the rear surface of the glass body, is ensured.

The lens system 10 shown in FIG. 1 consists of an insert 11, comprising a lens body 12, a glass body 13 and a space 14 with a plastic optical medium, together allowing transmission of the light signals from a fibre contact 16, being formed as a holder for one or several optical fibres 17, surrounded by an outer cover 18. The fibre contact 16 is guided into the insert 11 by means of a groove 20, received along the hole 19 of the insert, forming two longitudinally edges 21, which are parallel with the longitudinal axis 22 of the insert, to which the fibre contact 16 is compressed by means of the screw 23, and consequently, always becomes locked in the exact the same position The fibre contact shall be pressed against the stop bolt 24 by means of the force F. Hereby, the front surface 25 of the fibre contact will simultaneously be press the glass body 13 so that the rear surface 26 of the glass body will be placed in the focal point from the incident parallel beams, which have a fixed wavelength. Simultaneously, the rear surface 26 of the glass body will physically obtain a contact with the optical fibre 17, and thereby minimises the reflexes in the end surface of the optical fibre. The glass body 13 is movable in the axial direction, which is enabled by the O-ring 15, which when the fibre contact 16 is dismounted restores the glass body 13 to its original position 27. The front surface 25 of the fibre contact may have a plane or spherical design. Because of the flexibility of the O-ring a certain distortion of the front surface 25 of the fibre contact can be accepted. The lens body 12 is held in place against the stop 28 by means of an adhesive 29, in this example. A stop 30 is arranged onto the fibre contact 16 by means of force fitting. In this way, a decided distance C for a certain wavelength can be obtained, from the front surface 31 of the stop 30 to the front surface 25 of the fibre contact (see FIGS. 4 and 5). In FIG. 2 an example is shown on how to manufacture the measurement A easily, which is one of three important measurements. The insert 11, here having a particular embodiment adjusted to a spherical lens body which is grinded, so that it forms a bar lens with spherical end surfaces, is placed into a device 32. An annealed washer 33 is placed in the insert 11 against the stop 27, to which the glass body 13 then shall lie, with a fixed measure A. The device mandrel 34, being performed with the same radius 35 as the lens body 12, is pressed down against the annealed washer 33. In this way, a very accurate dimension of A can be contained. The dimension A should be slightly longer than the focal point located furthest away from the lens body 12. Hereby, the radius 35 on the mandrel 24 forms the stop 28 in the insert 11.

Figure 3:
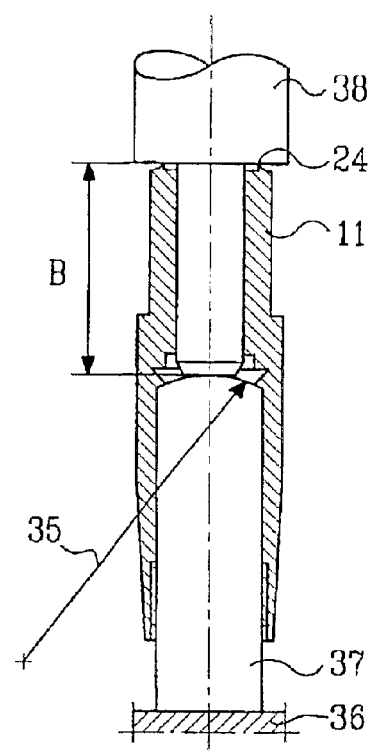
FIG. 3 shows a cross-section, in which the distance B, from the lens body to the stop of the fibre contact, is ensured.

FIG. 3 in principle shows the same manufacturing method as is shown in FIG. 2. Here, the insert 11 is turned and put onto the device 36, having a mandrel 27 having the same radius 35 as in FIG. 2. Here, the stop 28 of the insert rests on the radius 35, and the distance B from the lens body 12 can easily and very exactly be manufactured by pressing the mandrel down against the device's mandrel 37. Hereby, the annular, uprising edge is upset, and the stop 24 is obtained.

Figure 4:
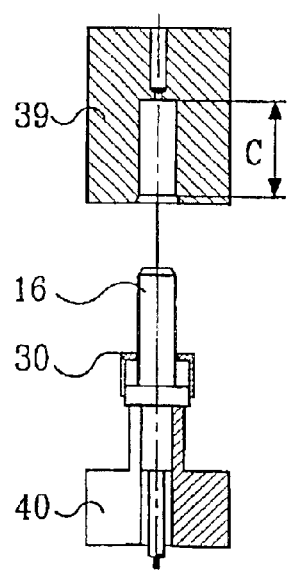
FIG. 4 shows a device embodiment for adjusting the distance C.

FIG. 4 shows two half-devices 39 and 40, and the fibre contact 16 with a stop 30 loosely attached thereto as well.

Figure 5:
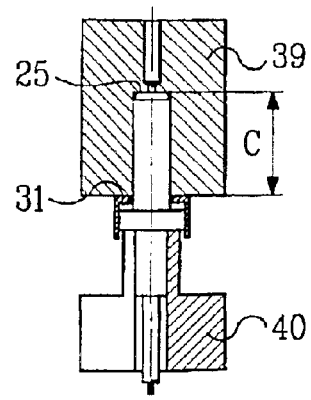
FIG. 5 shows the same device embodiment as in FIG. 4, in which the device is compressed.
Figure 6:
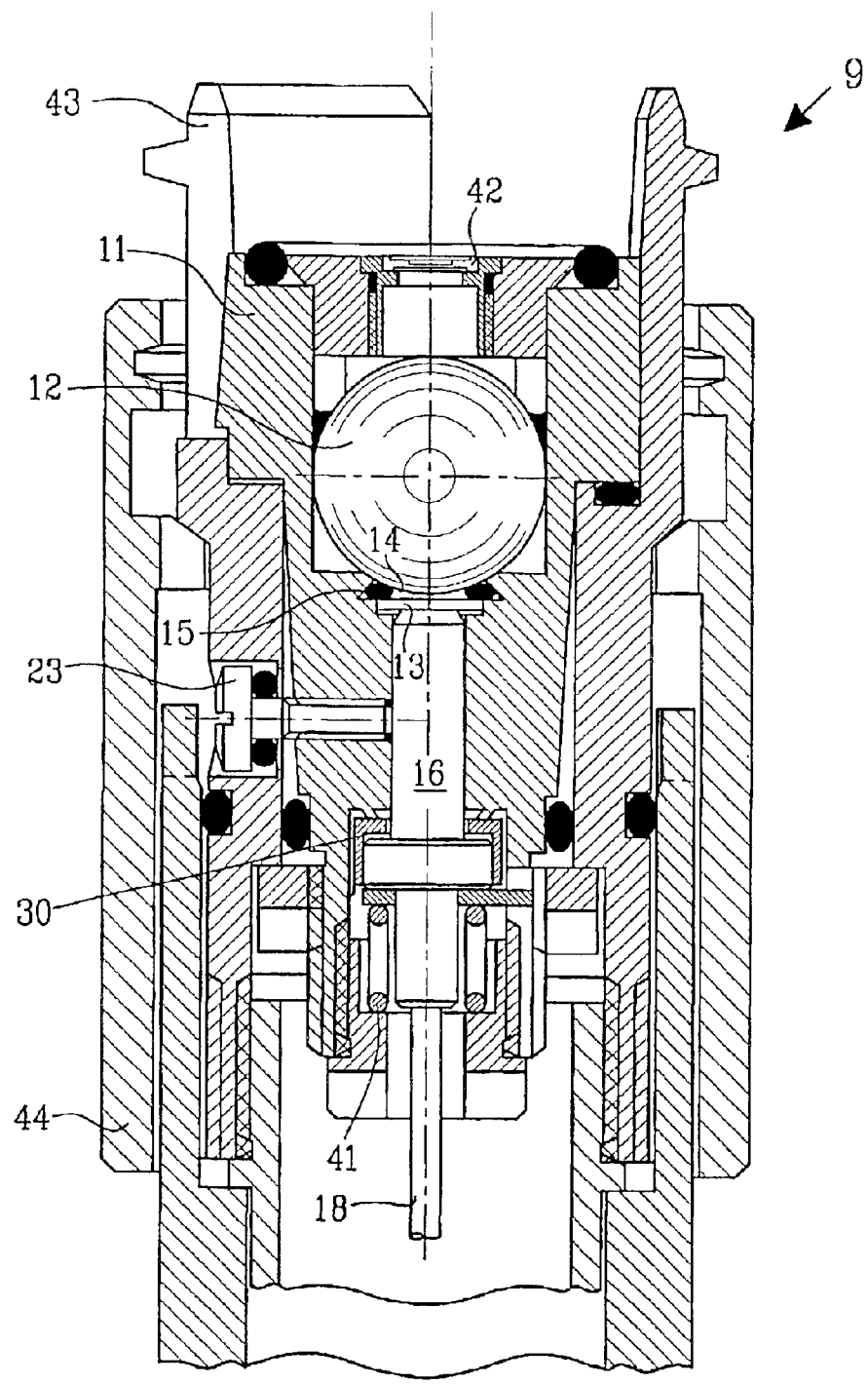

In FIG. 5 the half-devices 39 and 40 are shown compressed together, whereby the distance C is obtained between the front surface 31 of the stop and the front surface 25 of the fibre contact. Different devices 39 for different wavelengths must be used, but one and the s~e lens system can be used, i.e. one and the same coupling device as e.g. in FIG. 6. The coupling device 9 shown in FIG. 6 comprises the lens system 10 according to FIG. 1 built-in into a conventional neutral device, wherein 41 is a spring corresponding to the force F in FIG. 1, 42 is a protective glass protecting the lens body 12 from dirt, 43 are guides for coupling together two different coupling devices, and 44 is a connection nut, fixing the coupling devices in a fixed axial position. light conductor in a well-predetermined and repeatable way.

The coupling device is used as a damper by means of one or both the fibre contacts being axially displaced from their respective optimum positions so that the focal points of the lens system do not coincidence with the optical fibres any longer. If smaller values of the damping factor are desirable, it is sufficient if one of the fibre contacts is moved out of its optimal position. Then it is not matter if the displacement is done in the direction towards or away from the lens body.

When larger damping factors are desirable, it can be required that both fibre contacts are displaced. Then, this should be performed so that either both fibre contacts are moved longer from their respective lens bodies, or that the both contacts are moved closer thereto.

What is claimed is:

1. A coupling device for axially coupling the ends of very thin optical fibres each fixed in one coupling house, for achieving an optical connection between the fibres, and comprising: a lens system arranged in each coupling house including a lens body, a glass body, a space for an optical means, and a fibre contact coaxially arranged thereto, shaped as a holder for at least one fibre, the focal point of the lens body being arranged to coincide with the end surface of the fibre contact and the optical fibre, facing the lens body, said space being arranged between the lens body and the fibre contact for the optical means and the glass body, being arranged for forming the rear limitation of the lens system, and which glass body being axially adjustable by axially positioning the fibre contact so that it can be brought to take different distances to the lens body for an adjustment at different desired wavelengths.

2. A coupling device as claimed in claim 1, wherein the lens system is arranged in an insert located in the coupling house, and that the glass body is elastically biased towards the lens body in said insert.

3. A coupling device as claimed in claim 2, wherein a stopping device is arranged onto the fibre contact, which stopping device is axially displaceable and fixable along the fibre contact, for determining its insertion length in an insert arranged in the coupling house, for adjusting the lens system at different desired wavelengths.

4. A coupling device as claimed in claim 2, wherein a stop is arranged in the part of the insert, for receiving the lens body, for limiting the position of the lens body relatively to the glass body, which stop is adjustable for determining the distance from one of the rear end surfaces of the lens body to one of the rear end surfaces of the glass body.

5. A coupling device as claimed in claim 2, wherein the glass body is biased towards the body by the fibre contact.

6. A coupling device as claimed in claim 2 further comprising a flexible member which enables the glass body to move in an axial direction.

7. A coupling device as claimed in claim 1, wherein the front end surface of the lens body is convex, including spherical, partially spherical or aspherical, and that the rear surface of the lens system is arranged perpendicular to the longitudinal axis of the lens body and is arranged plane.

8. A coupling device as claimed in claim 1, wherein it is used as a damper by means of one or both of the fibre contacts, being axially displaced from their respective optimum positions, so that the focal points of the lens system do not coincide with the optical fibres any longer.

9. A coupling device as claimed in claim 8, wherein one of the fibre contacts is moved out of the optimum position so that the displacement is executed in the direction towards or away from the lens body.

10. A coupling device as claimed in claim 8, wherein both the fibre contacts are displaced so either both the fibre contacts are moved further away from their respective lens bodies, or the both contacts are moved closer thereto.

11. A coupling device for axially coupling the ends of very thin optical fibres each fixed in one coupling house, for achieving an optical connection between the fibres, comprising a lens system arranged in each coupling house including a lens body, a space for an optical means, and a fibre contact coaxially arranged thereto, shaped as a holder for at least one fibre, the focal point of the lens body being arranged to coincide with the end surface of the fibre contact and the optical fibre, facing the lens body, said space being arranged between the lens body and the fibre contact for the optical means, and which optical fibre being axially adjustable, by axially positioning the fibre contact so that it can be brought to take different distances to the lens body for an adjustment at different desired wavelengths.

* * * * *